March 12, 1968 K. PORTEOUS, SR 3,373,439

CODE-PUNCHED DOCUMENT RECORDING DEVICE

Filed May 22, 1962 4 Sheets-Sheet 1

INVENTOR.
KENNETH PORTEOUS, SR.
BY George C. Sullivan
Agent

INVENTOR.
KENNETH PORTEOUS SR.
BY George C. Sullivan
Agent

March 12, 1968 K. PORTEOUS, SR 3,373,439

CODE-PUNCHED DOCUMENT RECORDING DEVICE

Filed May 22, 1962 4 Sheets-Sheet 3

INVENTOR.
KENNETH PORTEOUS, SR.

BY George C. Sullivan
Agent

INVENTOR.
KENNETH PORTEOUS, SR.
BY
George C. Sullivan
Agent 3,373,439
CODE-PUNCHED DOCUMENT RECORDING DEVICE Kenneth Porteous, Sr., Glendale, Calif., assignor to Lockheed Aircraft Corporation, Burbank, Calif.
Filed May 22, 1962, Ser. No. 196,637
20 Claims. (Cl. 346—79)

This invention relates to a code-punched document recording device and more particularly to a new and improved apparatus for sensing and recording data items coded on a punched document for transcribing the data items to a visibly, magnetically, or other, readable tape.

In brief, this invention provides a new and improved apparatus using a plurality of spherical, or cylindrical, sensing elements which are extensible through data items in the form of openings punched or otherwise formed in the document and engageable by a recording means thereof during movement of the document past the recording means to record the data items on an impressionable or magnetically sensitive tape whereby the data items are transcribed onto the tape in the form of visibly or magnetically sensitive impressions or marks which can be read by visual or magnetic sensitive means.

More specifically, the sensing elements are extended through the coded openings of the document to be carried therewith past the recording means which includes an impression roller having a tape supported thereagainst, the roller being biased into engagement with the sensing elements so as to receive the impression from the sensing elements to thereby cause the magnetic or visible mark to be made on the tape, each mark corresponding to an opening coded on the document.

In accordance with this invention, the apparatus is provided with a carriage means for carrying the punched document columnwise past a magazine means storing the sensing elements and the recording means during its movement. In its opposite return movement, the carriage means carries the document and the sensing elements back to pass the magazine means in a reverse direction whereby cam means replaces the sensing elements into the magazine for storage and reuse thereof.

During its forward movement, to deposit the sensing elements in the openings of the document, the impression roller means of the recording means is spring biased into a first position to bias the tape to be engaged by the sensing elements. During the opposite, or return, movement of the carriage means, the impression roller means is automatically elevated to retain the impression roller means from engagement of the tape with the sensing elements so as to avoid recording the presence of any sensing elements.

It is therefore an object of this invention to provide a new and improved code-punched document recording device which transcribes items, coded as openings punched in a document, into marks on a tape to record the coded items so as to be readable by visual, magnetically sensitive, or other means.

Another object of this invention is to provide a new and improved recording device in which the coded punches are permanently or semi-permanently recorded on a tape by a magnetic carbon paper, or the like, tape which is disposable.

A further object of this invention is to provide a new and improved recording device which employs spherical or otherwise suitably configurated sensing elements extensible through the openings of the punched document during its movement in one direction and retainable therein for engagement with a tape so as to readably mark the tape during such movement of the document.

Yet another object of this invention is to provide a new and improved device of the character described wherein the sensing elements are automatically extended into the coded openings during such movement of the document.

A further object of this invention is to provide a new and improved apparatus of the character described which automatically positions the recording means so as not to engage the sensing elements during movement of the document in an opposite direction so as to avoid marking the tape or recording the presence of the sensing elements during such movement.

Yet another object of this invention is to provide a new and improved code punched document recording device which is capable of being automatically and cyclically operated to record the coded data punched in the document on a tape.

A further object of this invention is to provide a new and improved device of the character described which provides means for maintaining the cost of transcription at an economical level to make the application of the principle of automatically recording for feed back information from numerous remote points to a central processing area more practical.

Yet another object of this invention is to provide a new and improved device of the character described which is mechanically relatively simple in construction and is thereby more economical to manufacture and relatively trouble free to use.

One of the objects of this invention is to provide a new and improved device of the character described in which the sensing elements used for the recording procedure are returned to a storing magazine for reuse after recording the coded items on the tape and in which the sensing elements are further useful for advancing the tape.

Another object of this invention is to provide a new and improved recording apparatus which provides positive proof that a coded item of the document has been sensed in the form of a positive and direct reproduction of the hole by engagement with the sensing element.

A general object of this invention is to provide a new and improved apparatus for sensing and recording data items coded on a punched document which overcomes disadvantages of prior means and methods heretofore intended to accomplish generally similar purposes.

These and other objects of this invention will be more apparent from the following drawings, detailed description, and appended claims.

Figure 1:
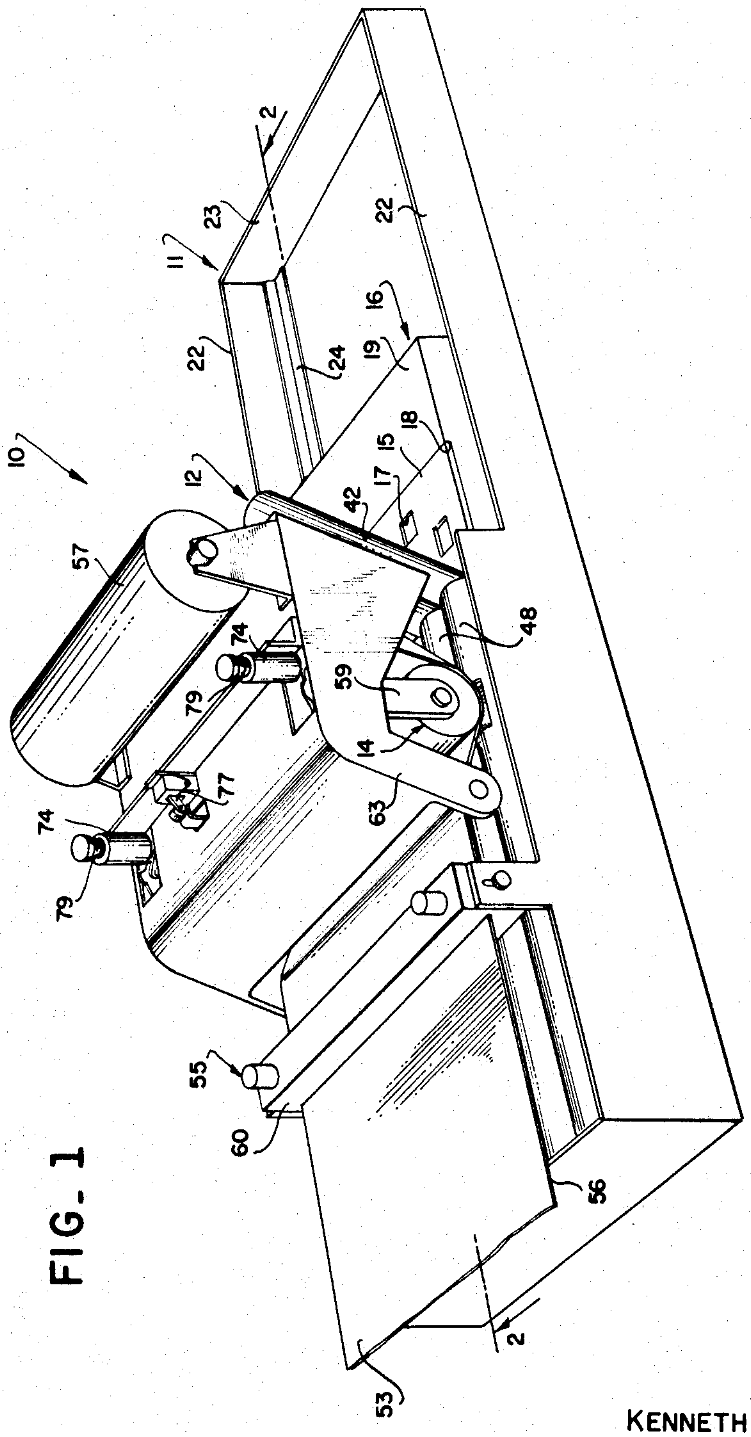
FIGURE 1 is a perspective view, in elevation, of the code punched document recording device of this invention.

Referring in detail to the drawings, there is shown by way of illustration, but not of limitation, an apparatus for sensing and recording data items coded in columns on a punched document, designed and constructed in accordance with this invention and generally indicated by the numeral 10. The apparatus 10 generally comprises a frame 11, a magazine 12 for receiving and storing a plurality of spherical, or optionally cylindrical, sensing elements 13, recording means 14 for recording data items coded on a punched document 15, and carriage means 16 mounted for movement relative to the frame 11 and adapted to carry the punched document 15 columnwise past the magazine 12 and recording means 14 during its movement.

The document 15 to which the apparatus of this invention is most practically used is a relatively flat rectilinear sheet of cardboard, or other suitable relatively rigid material, in which data items are coded by openings 17 punched, or otherwise formed by suitable means, to extend through the document and preferably arranged in column form whereby the carriage means 16 is adapted to carry the document columnwise during its movement relative to the frame 11. The document 15 is adapted to be supported by the carriage 16 in recess 18 provided in the upper surface 19 of the carriage. A flexible resilient clip 21 may be conveniently provided on the top surface 19 of the carriage 16 under which one edge of the document 15 may be clamped to assist in holding the document on the carriage.

The frame 11 is illustrated herein as being formed of rectilinearly arranged vertical side walls 22 and transverse end walls 23, the side walls 22 being substantially parallel and each having a rail 24 secured to the inner surface thereof and spaced from its bottom edge 26.

The carriage 16 is likewise substantially rectilinear, fitting within the frame 11 and is supported for reciprocal movement on the frame 11, and more specifically on the rails 24, by means of rollers or wheels 27 rotatably secured to the carriage and supported on the rails 24. Additional rollers or wheels 28 are preferably provided on the frame 11 and engaged with the side walls 22 to minimize lateral movement of the carriage 16 during its movement. It is to be understood, however, that the configuration of the frame and carriage may be of any desired form, being provided for the purpose of carrying the document in the functional path hereinafter described.

Means are provided for reciprocating the carriage means 16 relative to the frame 11, such means being shown, for purposes of illustration, as comprising a drive means in the form of an electric motor 29 having its driven shaft 31 non-rotatably secured to a pinion 32 having its peripheral teeth meshed with teeth of a linear rack 33 secured to the carriage means 16 whereby rotation of the pinion 32 in one or another direction, causes the carriage 16 to be moved in corresponding linear directions relative to the frame 11. The carriage 16 may be formed in any suitable cross-sectional configuration. A preferable form is shown herein wherein a lower U-shaped base portion 34 is provided with the wheels 27 and 28 and a plurality of upstanding flanges 35 integral with or secured to the base 34, one flange being provided for each column of the document to be transcribed. Each flange includes an equal plurality of depressions or notches 36 along its upper edge 37, the notches 36 of the upstanding flanges 35 being laterally aligned and equally spaced. A recess 18 is provided in the upper surface 19 of each flange and laterally aligned with the recess 18 of the adjacent flanges so as to form aligned recesses 18 adapted to receive the document 15 for support thereof. Each notch or depression 36 preferably includes rearwardly and forwardly inclined surfaces 39 and 41, respectively, the surface 39 having a substantially more acute inclination than the forwardly extending incline surface 41 for a purpose to be hereinafter described. The notches 36 are longitudinally spaced in increments equal to the spacing of the coded openings 17 punched into the document 15 so as to be aligned therewith when the document 15 overlies the carriage 16 so that each opening 17 overlies one of the notches 36.

The magazine 12 comprises a plurality of upwardly inclined tubular magazine elements 42 each capable of storing a plurality of the spherical sensing elements 13 and the carriage means 16 is adapted to be reciprocated for moving a punched document 15 past the magazine 12 columnwise relative to the document. A spring means 43 is preferably provided in each tubular element 42, each having one end 44 secured to the exterior of the magazine 12 and an opposite free end 46 overlying an uppermost sensing element 13 of its respective element 42 so as to bias the stacked plurality of elements 13 downwardly and outwardly of its tubular element 42 and towards its lower opening 47 facing the carriage 16. Other suitable resilient means, such as a compression coil spring (not shown) may be optionally provided within each tubular element 42 for biasing the sensing elements outwardly of the magazine.

When the document is moved (with the carriage 16) so as to align an opening 17 thereof with an opening 47 of an element 42, a sensing element 13 thereof is biased to extend through the opening 17 and reside in the notch 36 underlying the opening 17. Thereafter, as the carriage continues to move forwardly (to the left as viewed in the drawings) the deposited sensing element is moved with the carriage to progress to the left. As successive openings like 17 are aligned with the opening 47 of the magazine, other sensing elements 13 drop into the successive openings. If an unpunched portion of the document 15 passes under an opening 47 of the magazine, a sensing element is prevented from dropping into the notch 36 associated therewith.

An elongated arcuate guide 48 is contiguous with each inclined passageway 42 of the magazine 12 for guiding the elements 13 while residing in the notches 36 and for preventing inadvertent dislodging of the elements from their openings 17 and depressions 36 during movement of the carriage. An opening 49 is provided intermediate of the outer end of each guide-way 48 and its tubular portion 42 and in alignment with recording means 14 so that the sensing elements 13 are accessible through the guide-way for engagement by the recording means 14 in a manner to be hereinafter described.

Figure 4:
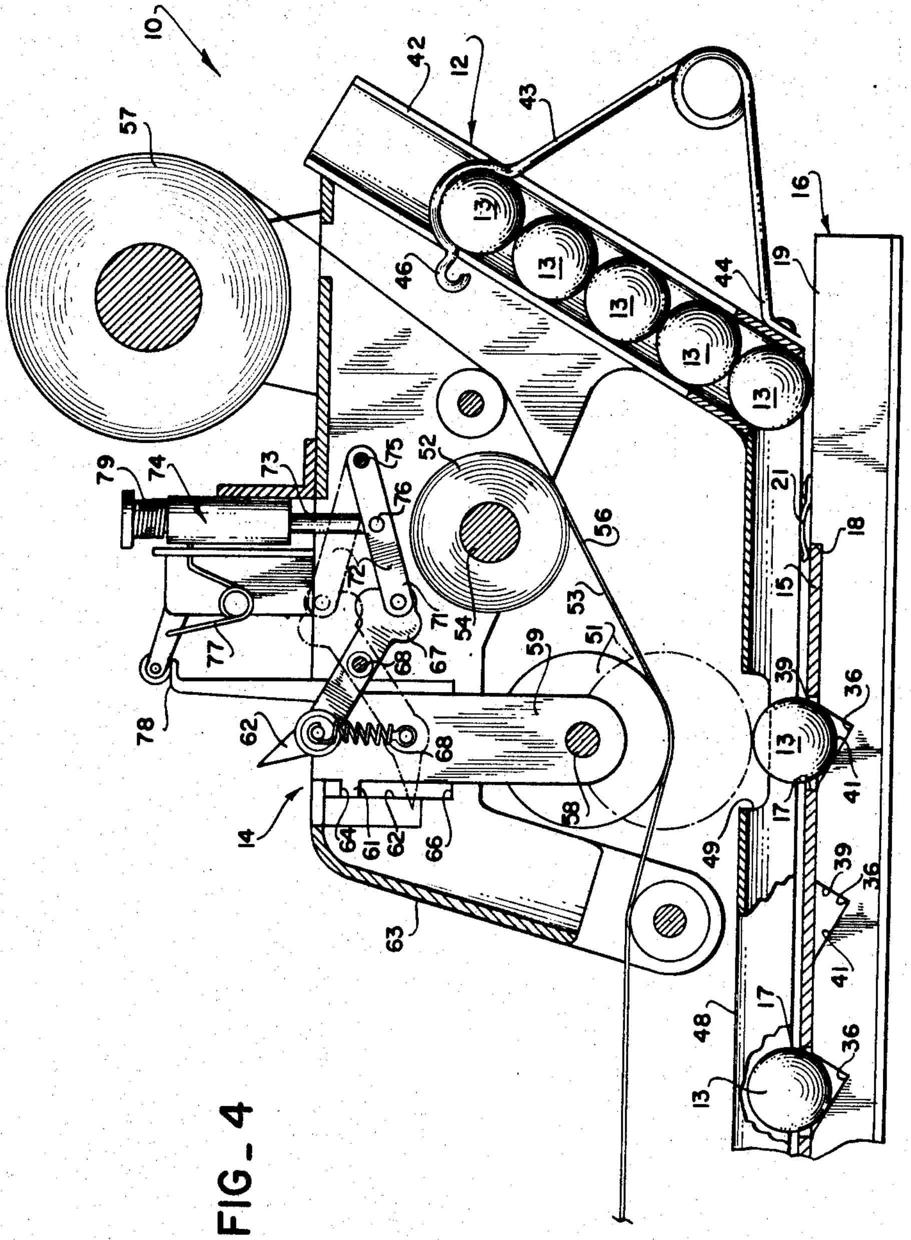
FIGURE 4 is an enlarged, fragmentary, vertical cross-sectional view, illustrating the recording means of FIGURE 3 in greater detail and in inactive position.

The recording means 14 comprises an impression roller means 51 which is automatically, or optionally selectively positionable into one of two positions, one position being that in which the roller means engage a sensing element 13 as it passes the recording means while moved with the carriage 16 and a second, non-engaging, position, the second position being an elevated position in which the roller 51 is retained above the plane of the sensing elements. The first position (of FIGURE 2), as will be hereinafter more fully described, is a position in which the roller is supported when the carriage 16 is moved forwardly (to the left) whereas the second position (of FIGURE 4) is one in which the roller means is inactively supported during the return movement of the carriage means 16 (to the right). It is of course to be understood that the device may be modified, if desired, so that the sensing elements may be recorded during movement of the carriage to the right instead of to the left.

A roll 52 of impressionable or otherwise markable tape such as paper, plastic, or other, tape, indicated by the numeral 53 is supported as on a pin 54 and passed under the roller 51 to extend away therefrom over an idler roller 56A. The tape 53 is interposed between the roller 51 and a sensing element when the roller element 51 is caused to be biased towards the carriage. By this means, as the sensing elements 13 are caused to pass the recording means, each in turn engages the tape 53 biased by roller 51 to impress a mark on the tape. In this manner, each sensing element 13 records its presence in an opening 17 and thereby the presence of a data opening 17 in the column of the document 15 by means of the mark on the tape.

The impressed mark may be recorded on the tape by various means and methods, one being by simply indenting or engraving the tape as the sensing element is engaged therewith. Another method may include making a visible mark by interposing a second tape, such as a tape 56 of carbon paper received from a separate supply roll 57 and interposed between the tape 53 and the sensing element 13. In this manner, as a sensing element engages the recording means, an impression is made against the tape 56 which can be visibly or otherwise detected on the tape 53. Optionally, the tape 56 may comprise a magnetic carbon tape which leaves a magnetic sensitive mark on the tape 53 in response to engagement of the sensing elements 13 therewith. Any combination of such marks which are engraved, visible and/or magnetically sensitive may be optionally employed. The tape 56 is, after recording, waste material and can be discarded whereas the tape 53 is retained as a permanent recording which can be read by correspondingly suitable magnetic, visible, electronic, and/or audio, sensitive means.

The tape 53 alone, or together with the tape 56, may be advanced from the rolls 52 and/or 57, respectively, by suitable tape advancing means 55 such as, for example, a clamp 60 mounted on the carriage 16 for movement therewith and whereby the marks on the tape are spaced longitudinally in accordance with the spacing of the sensing elements 13. Optionally, the tape advancing means may be independently operated and suitably synchronized with the drive means 29 in any suitable manner so as to advance the tape 53 and/or 56 at a rate of speed substantially equal to the speed of advancement of the doucment whereby the marks are spaced on the tape 53 in accordance with the spacing of data items punched in the document 15.

The impression roller means 51 is preferably formed of a relatively resilient or relatively rigid material, such as rubber, neoprene, plastics, or the like, and is rotatably supported on an axle 58 secured on a movable post 59. The post 59 is vertically movable so as to change the position of the axle 58, and thereby the roller 51 (previously described as first and second positions). For this purpose, an upper, enlarged portion 61 of the post 59 is reciprocal in a vertical slot 62 formed in an arm 63 of the frame 11 with upper and lower stops 64 and 66 being provided to limit the vertical movement of the post so as to determine the position of the roller 51 relative to the sensing elements 13.

An actuator link 67 is pivoted at an intermediate portion 68 thereof to the upper structure of the frame 11 and has one end pivotally secured to an upper end of the post 59 as by an extension spring 68 and its opposite end 71 pivotally secured to an operating lever 72 which, in turn, is pivoted at its opposite end 75 to the frame. The link 72 is movable by a force applied to its intermediate portion 76 by a plunger 73 of a solenoid 74, the plunger being pivotally secured to the link 72 at 76. When the solenoid actuator 74 is energized to extend the plunger downwardly, the plunger 73 pushes down on the pivot of the intermediate portion 76 of the link 72 to pivot the outer end 71 downwardly and thereby cause the link 67 to pivot about the point 68 and move its outer end upwardly to extend the spring 69 (as illustrated in broken lines in FIGURE 2 and in solid lines in FIGURE 4). The upper end 62 carries the post 59 upwardly with it.

Conversely, when the solenoid 74 is deenergized, by an electric circuit means to be hereinafter described, the plunger 73 is returned in its upper attitude by a compression spring 79 associated therewith. In this manner, when the solenoid 74 is energized, the roller means 51, through the linkage 72–67, is positioned into its upper position (shown in FIGURE 3) where it is clear of the path of the sensing elements 13 as the elements 13 pass the recording station. When the solenoid 74 is deenergized, the linkage 72 is pivoted upwardly by the force of the spring 79 to pivot the outer end of the link 67 downwardly and bias the post 59 downwardly to position the roller means 51 in its lowermost or sensing element-engaging position (shown in FIGURE 2).

In this latter position, the elements 13 are caused to engage the roller 51 or, more specifically, the tape 53 (and tape 57) for recording the presence of the sensing elements in the openings 17, i.e., for recording the presence of coded openings 17 in the document 15. The spring 69 serves to resiliently bias the post 59 to yieldably bias the roller 51 against the sensing elements 13 so as to prevent binding when the sensing elements engage the recording means. Another spring 77 is provided to bias an upwardly-extending extension 78 of the post 59 to normally bias the post into its lowermost, sensing element-engaging position of FIGURE 2.

This invention includes means for actuating and controlling the carriage means for movement relative to the frame so as to carry the punched document columnwise past the magazine means and the recording means during its movement. The actuating means is herein illustrated for example, as the electric motor 29 having the electric circuit shown in FIGURE 5. It is to be understood, however, that other suitable means may be employed for the purpose and for actuating the recording means into its selective positions, such as mechanical means including cams and the like (not shown).

Figure 5:
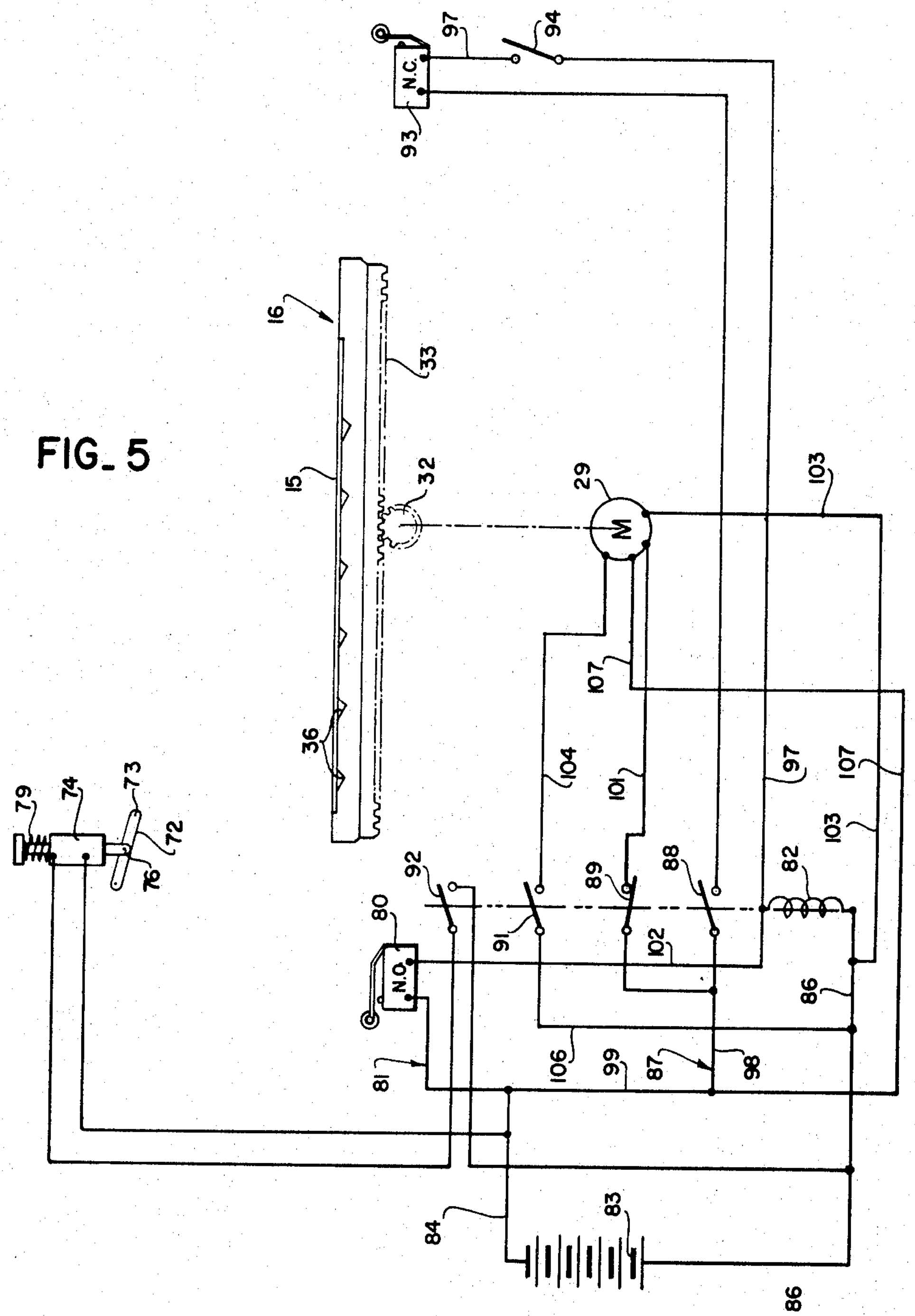
FIGURE 5 is a schematic diagram of means for actuating and controlling the device.

The electrical circuit of FIGURE 5 is shown as being provided for energizing the motor 29 so as to drive the carriage means 16 in a forward direction, through the pinion 32 and rack 33 whereby the punched document is carried columnwise past the magazine means 12 where a sensing element 13 is dropped into each punched opening 17 of the document 15 to deposit the sensing element 13 into a notch 36 underlying an opening 17 thereby depositing a sensing element in each coded opening of each column, to drive the carriage past the recording means for recording of the elements, and to drive the carriage in a reverse direction so as to return the carriage to its original position whereby the sensing elements are returned into the magazine means. The circuit is shown, additionally, for determining the position of the roller of the recording means 14 wherein the position is determined by the direction of movement of the carriage means.

Figure 3:
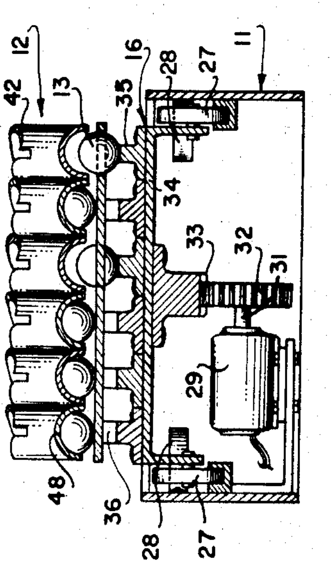
FIGURE 3 is a vertical, cross-sectional view, transverse relative to the plane of FIGURE 2 and as taken substantially along the line 3—3 of FIGURE 2.

In reference to the circuit diagram of FIGURE 5, correlated with FIGURE 3, the operation of the apparatus will be now more clearly understood. When the carriage 16 has been moved to the end of its travel, to the extreme left of the frame 11, and after recording of the sensing elements 13 by the recording means 14, a switch, in the form of a normally-open microswitch 80 mounted adjacent to the left end of the frame is engaged by the carriage 16 to close a circuit, generally designated by the numeral 81, to energize a relay coil 82 connecting the circuit to a source of electric power, designated by the battery 83, through conductors 84 and 86. Energizing of the relay 82 actuates a series of contacts to perform the following: a holding circuit 87 is closed through a normally-open switch blade 88 to keep the relay energized; switches 89 and 91 are opened and closed, respectively, to reverse the drive of the motor 29 so that the carriage 16 is moved in an opposite direction (to the right), and a switch blade 92 is closed to energize the solenoid 74 which, in turn, causes the impression roller 51 to be elevated so as not to engage any sensing elements 13 deposited in the openings 17 of the document 15 while the carriage 16 is being moved to the right. When the carriage 16 has reached its extreme right position, it contacts a normally-closed microswitch 93 to break the holding circuit 84. A manually-operable switch 94 is provided in the holding circuit 87 for selectively halting the operation of the device.

The holding circuit 87 further includes a conductor 96 connecting the switch blade 88 to the normally-closed switch 93 and a conductor 97 having the switch 94 connected to the relay 82 which is connected by the conductor 86 to the source of electrical energy or battery 83. Conductors 98 and 99 connect the other end of the switch blade 88 to the other side of the conductor 84 leading to the other side of the battery 83 (conductor 99 may conveniently be included in the circuit 87).

The switch blade 89 is connected to the field of the motor 29 through conductor 101 and through the conductors 102, 98, 99 and 84, to one side of the battery 83.

The other side of the field of the motor 29 is connected through conductors 103 and 86 to the other side of the battery 83 to drive the motor in one direction, to the right. A normally-open switch blade 91 of the relay is connected to reverse the field of the motor 29, when closed, through the conductor 104 connected to the motor 29, the conductors 106 and 86 connecting the field of the motor to one side of the battery 83 and through conductors 84, 99 and 107 connecting the motor to the opposite side of the battery 83 to drive the motor in an opposite direction (to the left). When the switch 89 is closed, and when the relay 82 is deenergized, the motor 29 is driven forwardly, to the left, to fill the openings 17 of the document 15 with sensing elements 13 whereas, when the normally opened switch blade 91 is closed, as when the relay 82 is energized, the motor 29 is driven in an opposite direction to drive the carriage 16 in an opposite direction (to the right) to return the carriage to its original position.

During the movement of the carriage to the right, to return to its original position, the sensing elements 13 are cammed out of the openings 17 of the document to be returned into the magazine 12. Each notch 36, as previously described, includes the rearwardly inclined surface 39 which is directed at an angle substantially parallel to the angle of the tubular portions 42 of the magazine, in which the sensing elements 13 are stored, and the surface 41 is substantially normal thereto. Therefore, as the carriage 16 moves to the right, the sensing elements 13 contact the edge cam surface 39 of the magazine elements 42 to cam the sensing elements 13 upwardly, into the elements 42 and against the bias of the spring 43 whereby the sensing elements 13 are returned into the magazine 12 in stacked relationship.

Figure 2:
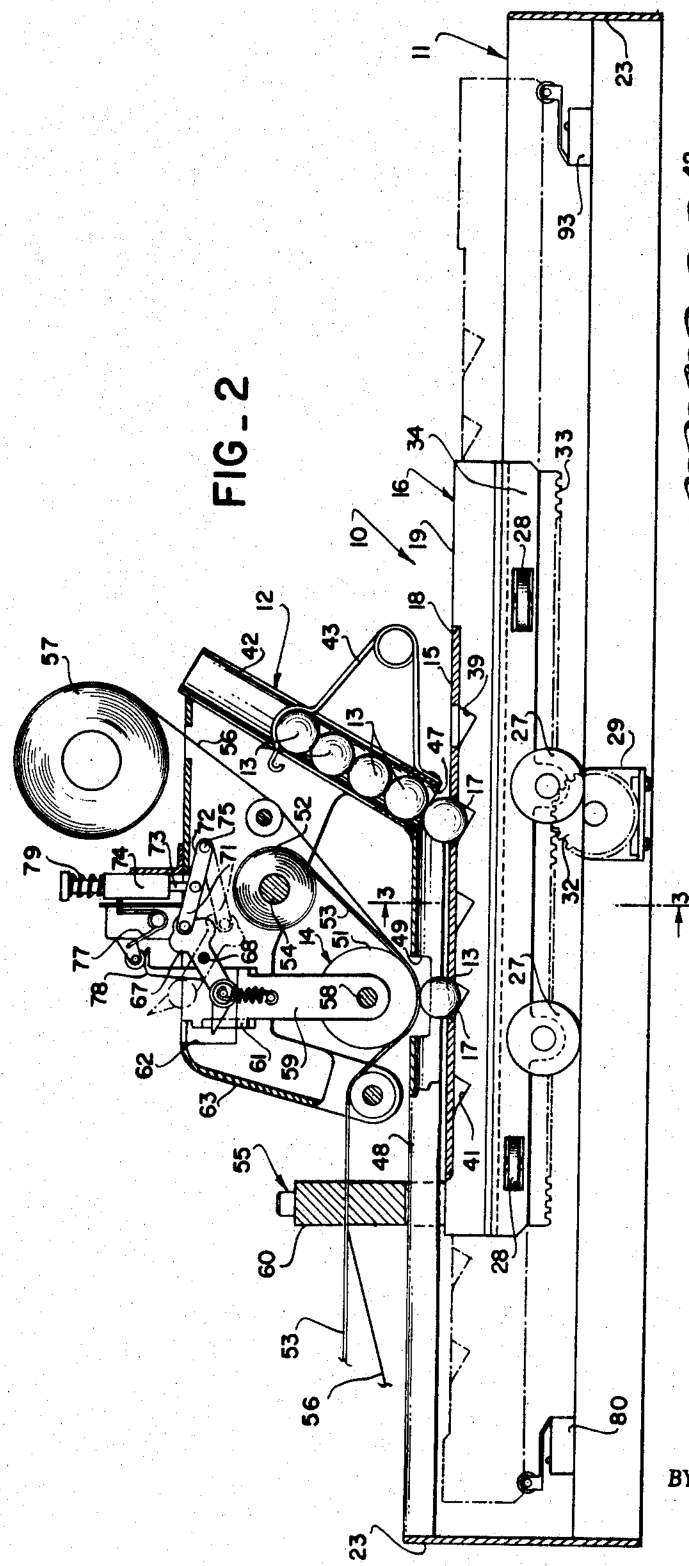
FIGURE 2 is an enlarged, vertical, cross-sectional view, as taken substantially along the line 2—2 of FIGURE 1, and illustrating recording means thereof in an active position.

It will be noted that when the holding circuit 87 is broken to deenergize the relay 82, the solenoid 74 is simultaneously deenergized to allow the spring 79 to extend the plunger 73 into its original, upper position to return the linkage 72, 67 into the position shown in FIGURE 2 wherein the impression roller 51 is lowered into its sensing element-engaging position thereby positioning the recording means 14 in a position wherein the tapes 53 and 57 and the print roller 51 are engageable by sensing elements carried past the recording means.

Movement of the carriage 16 to reciprocate may be cyclically repeated, if desired, or selectively halted by opening the switch 94 to open the holding circuit 87. A new document 15 may be deposited on the carriage 16 to replace the first document and the operation repeated, as desired, by closing the switch 94.

It is to be clearly understood that although the device 10 has been described as being automatically and cyclically operable by the actuating and controlling means illustrated and described herein, the carriage 16 may be optionally manually, mechanically, or otherwise, operated to reciprocate relative to the frame 11 to function in the manner described above and the print roller 51 may be automatically positioned into its sensing element-engaging and sensing element-non-engaging positions by manual engagement of the outer end 62 of the link 67. Optionally, a manually or mechanically operable cam, or other, means may be provided, including a cam, or the like (not shown) operable for engaging the arm 59 in a suitable manner so as to lift the impression roller means 51 into its element-non-engaging position in response to movement of the carriage 16 to the right.

While there is herein shown and described what is conceived to be the most practical and preferred embodiment of this invention, it is recognized that departures may be made therefrom within the scope of this invention which is not limited to the details disclosed herein but is to be accorded the full scope of the claims so as to embrace any and all equivalent devices.

What is claimed as new and desired to secure by Letters Patent is:

1. An apparatus for sensing and recording data items coded in columns as a series of perforations on a document, comprising:
   - a frame;
   - a plurality of sensing elements;
   - magazine means fixed on said frame for receiving, storing, and delivering the sensing elements into the perforations in the document;
   - recording means on said frame for registering each sensing element in the perforations in the document;
   - carriage means mounted for supporting the document and moving it columnwise past the magazine means and the recording means; and
   - said carriage means having a plurality of element-receiving depressions equal in number to the maximum number of data items codable in a column of the document and in spaced increments substantially equal thereto so as to underlie perforations in the document whereby the carriage means moves a document past the magazine means to deposit the sensing means in the document perforations and also past the recording means where the sensing means are registered.

2. An apparatus as defined in claim 1, wherein said recording means includes:
   - (a) impression roller means in the path of movement of said carriage means and engageable by a sensing element received in a depression when passing said recording means; and
   - (b) tape supply means for supporting an impressionable tape so as to pass over said impression roller means and to be interposed between said impression roller means and said sensing means when engaged by a sensing element.

3. An apparatus as defined in claim 2, including:
   - (a) limiting means for limiting movement of said carriage means.

4. An apparatus as defined in claim 1, including:
   - (a) resilient means associated with said magazine means for biasing said sensing elements outwardly of said magazine means in a direction to seek a punched data opening of a punched document supported on said carriage means and aligned with said magazine means so as to pass through said opening for deposit of a sensing element in a depression underlying said opening in response to movement of said carriage means relative to said magazine means.

5. An apparatus as defined in claim 4, wherein said sensing elements are automatically biased into a depression underlying a data opening in response to movement of said carriage means relative to said magazine means in one direction.

6. An apparatus as defined in claim 5, including:
   - (a) cam means for progressively biasing said sensing elements received in a depression out of the opening of the punched element so as to re-enter said magazine in response to movement of said carriage means in an opposite direction.

7. An apparatus as defined in claim 6, wherein said resilient means of said magazine means is yieldable so as to yield in response to re-entry of said elements into said magazine means.

8. An apparatus as defined in claim 2, including:
   - (a) means positioning said impression roller means into a first position for engagement with a sensing element passing said recording means in said one direction.

9. An apparatus as defined in claim 8, including:
   - (a) means for positioning said impression roller means into a second position spaced from the path of movement of said sensing elements when deposited in said depressions so as to be in a non-engaging position relative to said sensing elements during movement of said carriage means in said opposite direction.

10. An apparatus as defined in claim 9, including:
(a) means for automatically positioning said impression roller means into said second position in response to movement of said carriage means in said opposite direction.

11. An apparatus as defined in claim 2, including:
(a) means for guiding said carriage means during its movement relative to said frame.

12. An apparatus as defined in claim 2, including:
(a) means for retaining sensing elements deposited in a depression of said carriage means during movement of said carriage means.

13. An apparatus as defined in claim 6, wherein said cam means includes a sloped face on each of said depressions for biasing said sensing means in a direction to re-enter said magazine means in response to movement of said carriage means in a preselected direction.

14. An apparatus as defined in claim 8, including:
(a) spring means for biasing said impression roller means into said first position, said spring means being selectively actuatable to bias said impression roller means into said second position.

15. An apparatus as defined in claim 14, wherein said spring means is automatically actuatable for biasing said impression roller means into said second position in response to movement of said carriage means in said opposite direction.

16. An apparatus as defined in claim 2, including:
(a) yieldable resilient means for biasing said impression roller means against said tape means.

17. An apparatus for sensing and recording data items coded in columns on a document as a series of perforations comprising:
a plurality of sensing elements;
magazine means fixedly mounted for delivering the sensing elements one each into each perforation of the document;

recording means for registering the presence of the sensing means in the document;
means for supporting and transferring the document past the magazine means and the recording means.

18. An apparatus as defined in claim 17, wherein said recording means includes:
(a) impression roller means positionable in the path of movement of sensing elements supported in said punched openings of said document for engagement therewith; and
(b) tape supply means on said impression roller means and having an advanceable tape impressionable against said sensing elements in response to engagement of said impression roller means with said sensing element.

19. An apparatus as defined in claim 18, wherein said magazine means and said recording means are operable for automatically and cyclically recording data items punched in said document in response to movement of said document relative thereto.

20. An apparatus as defined in claim 18, including:
(a) tape advancement means for advancing said tape in response to movement of said carriage means so as to longitudinally space said recorded data on said tape to correspond to spacing of said data items on said document.

References Cited

UNITED STATES PATENTS 2,980,320 4/1961 Lapointe -------- 235—61.113

DARYL W. COOK, *Primary Examiner.*

MALCOLM MORRISON, MAYNARD R. WILBUR, *Examiners.*

S. DAVID, *Assistant Examiner.*